April 30, 1929. F. S. CARR 1,711,453
NUT AND SCREW FASTENING
Filed July 22, 1925
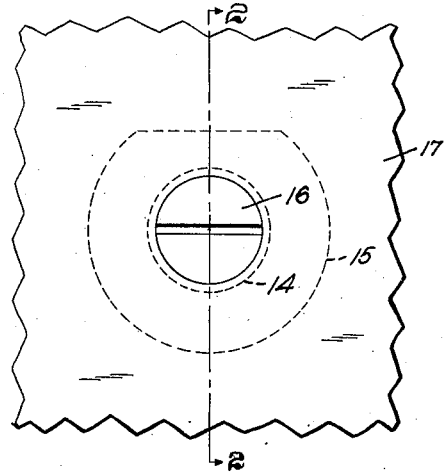
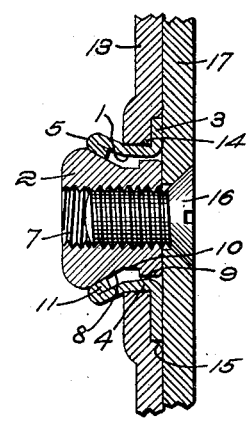
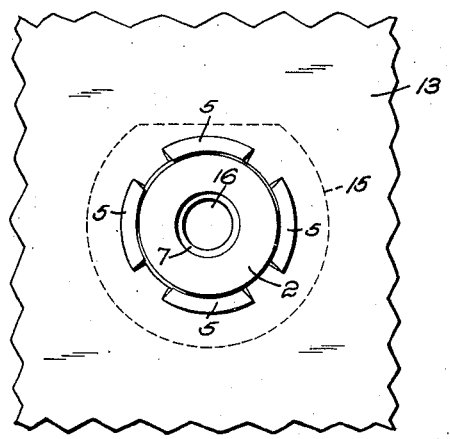
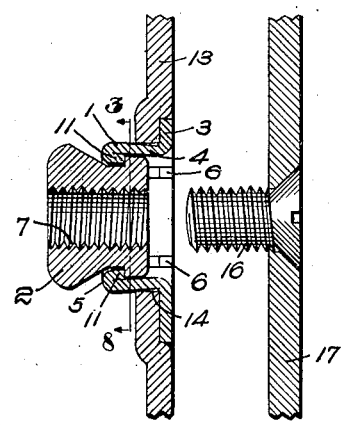
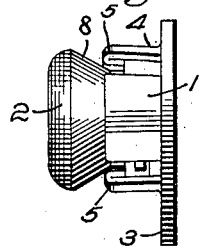
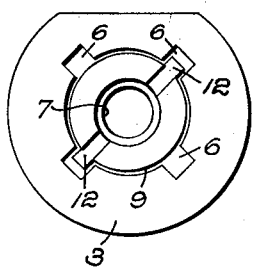
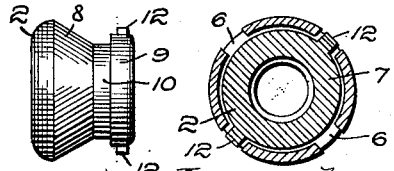
Inventor:
Fred S. Carr,
by Emery Booth Janney & Varney
Attys.

Patented Apr. 30, 1929.

1,711,453

UNITED STATES PATENT OFFICE.

FRED S. CARR, OF NEWTON, MASSACHUSETTS, ASSIGNOR, BY MESNE ASSIGNMENTS, TO CARR FASTENER COMPANY, A CORPORATION OF MASSACHUSETTS.

NUT AND SCREW FASTENING.

Application filed July 22, 1925. Serial No. 45,262.

This invention aims to provide an improved nut and screw fastening device.

In the drawings, which illustrate a preferred embodiment of my invention:—

Figure 1 is a front elevation of the fastening installation;

Fig. 2 is a section on the line 2—2 of Fig. 1, being partly in elevation;

Fig. 3 is a rear elevation of the completed fastening installation;

Fig. 4 is a section of the parts of the installation before being assembled, the screw being shown in elevation;

Fig. 5 is a side elevation of the nut-holder and nut-part of the fastening device;

Fig. 6 is a front elevation of the nut-holder and nut;

Fig. 7 is a side elevation of the nut before assembly with the nut-holder; and

Fig. 8 is a section on the line 8—8 of Fig. 4, showing the interengaging means between the nut and nut-holder.

Referring to the drawings, I have shown a fastening device in the form of a bolt particularly, though not exclusively, useful in securing pieces of metal together. This device is peculiarly adapted for use in connection with all-metal automobile body construction for securing hinges, locks, etc., to the body. It is especially suitable for use in places where the back face of the support for the nut part is inaccessible after the body or parts thereof have been formed.

The nut part of the device includes a nut-holder 1 and a nut 2 initially assembled at the point of manufacture. The nut-holder is formed from a single piece of metal and has a relatively thin base portion 3, a neck 4 and a reversely bent head 5. To permit contraction and expansion of the head 5, I have provided a plurality of slits 6 which extend from the head 5 into the base 3 of the nut-holder, as best illustrated in Figs. 5 and 6. The nut is provided with internal threads 7 and has a tapered shoulder 8 enlarged toward the inner end of the nut, a flange 9 at the outer end of the nut, and a groove 10 between the shoulder and the flange. When the nut and nut-holder are secured together, the reversely bent portions 11 of the head (Fig. 4) are snapped into the groove 10 in the nut. The nut is also provided with a plurality of projections 12 formed from the flange 9, and extending into the slits 6 to prevent relative rotation between the nut and nut-holder, as hereinafter more fully described.

The support for the nut-holder 1 is shown as a sheet metal part 13 presenting an aperture 14 therethrough surrounded by a depressed portion 15 for reception of the base portion 3 of the nut-holder. The aperture 14 is relatively smaller in diameter than the greatest diameter of the head 5. Thus the head 5 contracts when forced through the aperture and expands after passing therethrough so as to overlie a portion of the back face of the sheet metal part 13 (Fig. 4), thereby to hold the nut in assembled relation with the support. The above-described snap-in arrangement is very important, inasmuch as the nut-holder may be secured to the support at any time during assembly of the body of an automobile or the like. The nut will thereafter remain in its proper place and be ready for use, no matter what angle the support may thereafter assume.

The groove 12 and the flange 9 are sufficiently smaller in diameter than the inside diameters of the nut-holder adjacent the groove and flange to permit contraction of the head 5 without interference from the nut when the nut-holder is being snapped into engagement with the support 13.

The nut-holder may be held against rotation relative to the support by any suitable means, but I prefer to form the base 3 of the holder and the depressed portion 15 of the support with cooperating straight sides (Figs. 2, 3 and 6) to prevent relative turning movement during assembly of the lock or other like part to the body of the car.

The screw part 16 of the device passes through the part to be secured to the sheet metal part 13, shown in the drawings as a second sheet metal support 17, but which may be anything that is to be strongly secured to the part 13, and is then entered in the threaded hole in the nut and turned relative thereto for engagement therewith. During the thread-engaging operation between the screw 16 and nut 2, the two supports are drawn together without exerting sufficient strain upon the nut-holder to release it from its support. When all the lost motion between the parts has been taken up, further turning of the screw will draw the nut 2 into the nut-holder and toward the screw support 17. This axial movement of the nut causes the tapered shoulder 8 to act upon the reversely bent portions 11 and spread the resilient portions of the head 5 about the inner edge of the wall surrounding the aperture 14. The head 5 of the nut-holder 1 is thereby distorted and back-supported by the tapered shoulder of the nut to such an extent that the whole installation is firmly held together, as illustrated in Fig. 2. The nut-holder is sufficiently strongly held in assembled relation with its support as to be capable of withstanding all reasonable strains without being separated therefrom. After the head 5 has been upset, the nut 2 is held so tightly thereby that the nut 2 and screw 16 cannot be loosened by constant vibration of the supporting parts.

The projections 12 prevent relative turning between the nut 2 and the nut-holder, during the screwing together operation of the nut 2 and the screw 16, while permitting axial movement of the nut relative to the nut-holder as hereinbefore described.

While I have shown and described a preferred embodiment of my invention, it will be understood that changes involving omission, alteration, substitution and reversal of parts and even changes in the mode of operation may be made without departing from the scope of my invention, which is best defined in the following claims.

Claims:

1. An expansible fastening device comprising, in combination, a nut-holding part having a base portion and a contractible and expansible head, said head being adapted to be snapped through an aperture in a relatively thin support, thereby initially securing said fastening device to the support, a nut having a depression into which a portion of said nut-holding part extends to initially secure said nut with said nut-holding part, that portion of said nut within said nut-holding part being smaller in diameter than the inside diameter of the inner wall portion of the nut-holding part adjacent the nut and means provided by said nut whereby when said nut is moved axially relative to said nut-holding part said head may be distorted sufficiently to prevent release of said fastening device from its support.

2. An expansible fastening device comprising, in combination, a nut-holding part having a base portion from which is pressed a contractible and expansible head for initially securing said fastening device in an aperture provided in a suitable support, a nut loosely assembled with said nut-holding part to permit initial contraction of said head, means providing a groove in said nut and resilient means presented by said nut-holding part and snapped into said groove to hold the nut in assembly with the nut-holding part, interengaging means located between said nut and nut-holding part to prevent relative rotation and means presented by said base portion to interlock with a support and prevent rotation.

3. A fastening installation comprising, in combination, a support presenting an aperture therethrough, a nut-holding part having a resilient head contractible to permit passage thereof through the aperture and expansible to secure the nut-holding part in assembled relation with the support, means for preventing rotation between the support and the nut-holding part, a nut initially assembled with said nut-holding part, cooperating means for preventing relative rotation between the nut and its holder, a second support and a nut-engaging part passing through said support for engagement with said nut to move said nut axially relative to said nut-holding part, thereby to distort the head of said nut-holding part to secure said supports together and prevent separation of said nut-holding part from its support when an outward pull is exerted thereupon.

4. A fastening installation comprising, in combination, a support presenting an aperture therethrough, a nut-holding part having a resilient head relatively larger in diameter than the diameter of the aperture in the support, thereby resiliently to secure said nut-holding part in assembled relation with the support, a nut loosely assembled with said nut-holding part housed within the resilient head and the remaining portion located outside of the resilient head, said nut having means which, when moved axially relative to the resilient head, will expand and back-support said head, nut-engaging means presented by a second support for engagement with said nut for expanding said head to such an extent as to prevent separation of the nut-holding part from its support and to secure said second support to the first support, and interengaging means for preventing relative rotation between the nut-holding part, nut and first mentioned support during expansion of said head.

5. A fastening installation comprising, in combination, a support presenting an aperture therethrough, a nut-holding part having a resilient head relatively larger in diameter than the diameter of the aperture in the support, thereby to initially secure said nut-holding part in assembled relation with the support, a nut held in assembled relation with said nut-holding part, a tapered shoulder on said nut adjacent the head of said nut-holding part and means for moving said nut axially relative to said nut-holding part, thereby to bend the resilient portions of said head about the inner edges of the wall surrounding the aperture presented by said support.

6. An expansible fastening installation including a support presenting an aperture therethrough, a non-cylindrical depressed portion surrounding said aperture, a resilient nut-holder having a base fitting into said depression so as to be flush with the outer face of said support and non-rotatable relative thereto, a neck engaging the wall surrounding said aperture and a contractible and expansible head overlying the back face of said support to hold said nut-holder in assembled relation with said support and a nut carried by said holder for receiving a screw presented by a part to be secured to said support, said nut adapted to be shifted axially relative to said nut-holder to upset the head of said nut-holder and prevent separation thereof from said support.

7. In combination, a nut-holder having a contractible and expansible head having an aperture in its outer end and a number of yieldable nut-engaging portions arranged about said aperture, a nut having means for loosely receiving said nut-engaging portion to hold the nut in assembly with said nut-holder while permitting contraction of said head, said nut having a tapered portion normally extending beyond the free end of the head of the holder and said nut being shiftable axially relative to said holder for expanding said head after it has been snapped through an aperture in a support, thereby rigidly to secure said nut-holder to the support and means cooperating between the nut-holder and the nut to prevent relative rotation.

8. In combination, a nut-holder having a portion thereof slit to provide a contractible and expansible head having an opening in its end, inwardly bent portions of said head surrounding said aperture, a nut having an annular groove loosely receiving the inwardly bent portions of said holder which surround the opening therein and the holder receiving a flange portion of the nut, said flange portion being of larger diameter than the opening in the head of the holder, thereby providing means for holding the nut in assembled relation with the holder when pressed through the opening in the head thereof, means providing a clearance between the nut and holder to permit contraction of the head of the holder when being attached to a support and means provided by the nut for expanding said head beyond its normal elastic limit.

In testimony whereof, I have signed my name to this specification.

FRED S. CARR.